United States Patent
Wideman et al.

(10) Patent No.: US 7,285,333 B2
(45) Date of Patent: Oct. 23, 2007

(54) TIE-LAYER MATERIALS, ARTICLES AND METHODS FOR MAKING AND USING SAME

(75) Inventors: Thomas W. Wideman, Milton, MA (US); Michael Feechan, Sagamore, MA (US)

(73) Assignee: Fiberspar Corporation, New Bedford, MA (US)

( * ) Notice: Subject to any disclaimer, the term of this patent is extended or adjusted under 35 U.S.C. 154(b) by 206 days.

(21) Appl. No.: 10/792,288

(22) Filed: Mar. 3, 2004

(65) Prior Publication Data

US 2004/0265524 A1    Dec. 30, 2004

Related U.S. Application Data

(60) Provisional application No. 60/451,815, filed on Mar. 3, 2003.

(51) Int. Cl.
*B32B 1/08* (2006.01)
*F16L 11/04* (2006.01)

(52) U.S. Cl. ............... 428/451; 428/35.9; 428/36.9; 428/36.91

(58) Field of Classification Search ............. 428/451, 428/35.9, 36.91, 36.9
See application file for complete search history.

(56) References Cited

U.S. PATENT DOCUMENTS

| | | | |
|---|---|---|---|
| 5,629,062 A * | 5/1997 | Ejiri et al. ............. | 428/36.9 |
| 5,921,285 A | 7/1999 | Quigley et al. ............. | 138/125 |
| 6,004,639 A | 12/1999 | Quigley et al. ............. | 428/36.3 |
| 6,016,845 A | 1/2000 | Quigley et al. ............. | 138/125 |
| 6,148,866 A | 11/2000 | Quigley et al. ............. | 138/125 |
| 6,663,453 B2 | 12/2003 | Quigley et al. ............. | 441/133 |
| 6,764,365 B2 | 7/2004 | Quigley et al. ............. | 441/133 |
| 6,894,115 B2 * | 5/2005 | Botros ........................ | 525/101 |
| 2002/0185188 A1 | 12/2002 | Quigley et al. ............. | 138/137 |

OTHER PUBLICATIONS

Grant & Hackh's Chemical Dictionary, Fifth Edition (1987), p. 533.*
Ranade et al., "Surface Modification of Polyethylene and Ultrahigh Molecular Weight Polyethylene for Improved Interfacial Adhesion in Silica/Methacrylate Composites," Polymeric Materials: Science & Engineering, 88:260-261 (2003).
Arkles, Barry, "Tailoring surfaces with silane," Chemtech, 7:766-778 (1977).
Weng et al., "Short Notes # 5 (Revised) Silane Coupling Agents," www.sinrubtech.com.my/short%20notes/Short%Notes%205.1.htm, p. 1-14 (1999).

* cited by examiner

*Primary Examiner*—D. S. Nakarani
(74) *Attorney, Agent, or Firm*—Goodwin Procter LLP

(57) ABSTRACT

A composite article is provided that includes a polyolefin layer, a tie-layer, and a non-polyolefin. The tie-layer may comprise a silicon modified polyolefin. Methods are also provided for adhering a polyolefin to a non-polyolefin. Such articles may used, for example, in composite tubing.

15 Claims, 1 Drawing Sheet

TIE-LAYER MATERIALS, ARTICLES AND METHODS FOR MAKING AND USING SAME

RELATED APPLICATIONS

This application claims priority to U.S. Ser. No. 60/451,815 filed Mar. 3, 2003, and hereby incorporated by reference in its entirety.

BACKGROUND

Polymeric and composite parts may be composed of layers of different materials. For some applications, adhesive bonding is sufficient to join the different materials. In other applications, it may be necessary for these dissimilar materials to be chemically bonded together through covalent bonds.

A common combination of dissimilar materials is polyolefins and non-polyolefins. non-polyolefins may include, for example, thermoplastics, elastomers, thermoplastic elastomers, thermosets, metals, metal oxides, ceramics, alone or in combination. In most cases, it is difficult to covalently bond unmodified polyolefins directly to the non-polyolefins. Therefore, a "tie-layer" is commonly used between the two materials. A tie-layer is often a material that has properties of both the polyolefin and the non-polyolefin. Frequently, the tie-layer has similar melt processing properties as the polyolefin while being chemically reactive toward the non-polyolefin. The chemically reactive properties of the tie-layer may be incorporated during polymerization of the tie-layer, or by secondary reactions on a preformed polymer.

For example, composite tubing may be constructed from layers of dissimilar materials. For some applications, it may be necessary for these dissimilar materials to be chemically bonded together. A common combination of dissimilar materials that may be found in a spoolable tube are polyolefins and non-polyolefins. The non-polyolefinic materials are commonly thermoplastic or thermosetting resins that may be used as a matrix for fibers.

Most commercially available tie-layers for joining polyolefins to non-polyolefins have hydrolytically unstable moieties in the polymer backbone, pendent to the polymer backbone, or created via the reaction of the tie-layer with the non-polyolefin.

Applications for multi-layer or composite parts may require the covalent bonds between the different materials to be stable to water at elevated temperatures. Composite tubing, for example, is frequently used in applications where water or water vapor is present at temperatures greater than 140° F. Under these conditions, the hydrolyzable groups of a tie-layer may be split by the water, thus degrading the polyolefin to non-polyolefin bonding.

Therefore, there is a need for tie-layer materials to join polyolefins to non-polyolefins which do not contain hydrolyzable moieties.

SUMMARY

The present disclosure is directed, in part, to composite articles that include at least one layer of a polyolefin material connected through a tie-layer to at least one layer of a non-polyolefin. The tie-layer may include a silicon-modified polyolefin.

A tie-layer may include may include structures such as:

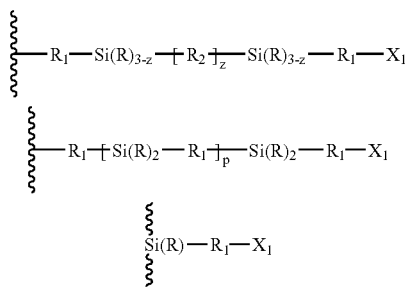

where the wavy line ~~~ represents a polyolefin segment. $R_1$ independently for each occurrence represents an organic or inorganic moiety or a bond and $R_2$ independently for each occurrence represents an organic moiety, an inorganic moiety, or a bond. R independently for each occurrence represents an organic or inorganic moiety. $X_1$ independently for each occurrence represents an organic or inorganic moiety. $X_1$ may include at least one moiety that is capable of bonding to a non-polyolefin, for example, $X_1$ may comprise a vinyl, epoxy, or amine moiety.

The integer z represents the number of linkages between the $Si(R)_{3-z}$ moieties. Z may be the integer 1, 2, or 3. P may be an integer from 0 to about 1000.

$R_1$ and $R_2$ may be selected independently from the group consisting of alkyl, alkenyl, and alkynyl, —O—, alkoxy, aryl, heterocyclyl, polycyclyl, carbocycles, and a bond. In some embodiments, $R_2$ independently for each occurrence may represent an acetyl moiety, alkyl ether, arylether, —O—, or a bond.

In another part, the disclosure provides for a composite tube that comprises a polyolefin layer, and a composite layer, wherein the polyolefin layer is bonded to the composite layer through a tie-layer, wherein the tie-layer comprises a silicon moiety.

In another part, the disclosure provides for a method of adhering a polyolefin to a non-polyolefin, comprising providing a silicon modified polyolefin, contacting said silicon modified polyolefin with a coupling agent to form a tie-layer, contacting the tie-layer to a non-polyolefin and a polyolefin to form a composite structure, and exposing the composite structure to conditions sufficient to create adhesion between the polyolefin and the non-polyolefin. The coupling agent may include a silane moiety.

In another part, the disclosure provides for a method of adhering a polyolefin to a non-polyolefin, comprising providing a polyolefin modified with a reactive moiety, contacting the modified polyolefin with a silane coupling agent to form a tie-layer, contacting the tie-layer to a non-polyolefin and a polyolefin to form a composite structure, and exposing the composite structure to conditions sufficient to create adhesion between the polyolefin and the non-polyolefin.

BRIEF DESCRIPTION OF THE DRAWINGS

These and other features and advantages of the composite tube disclosed herein will be more fully understood by reference to the following detailed description in conjunction with the attached drawings in which like reference numerals refer to like elements through the different views.

The drawings illustrate principles of the composite tubes disclosed herein and, although not to scale, show relative dimensions.

DETAILED DESCRIPTION OF EXEMPLARY EMBODIMENTS

Figure 1:
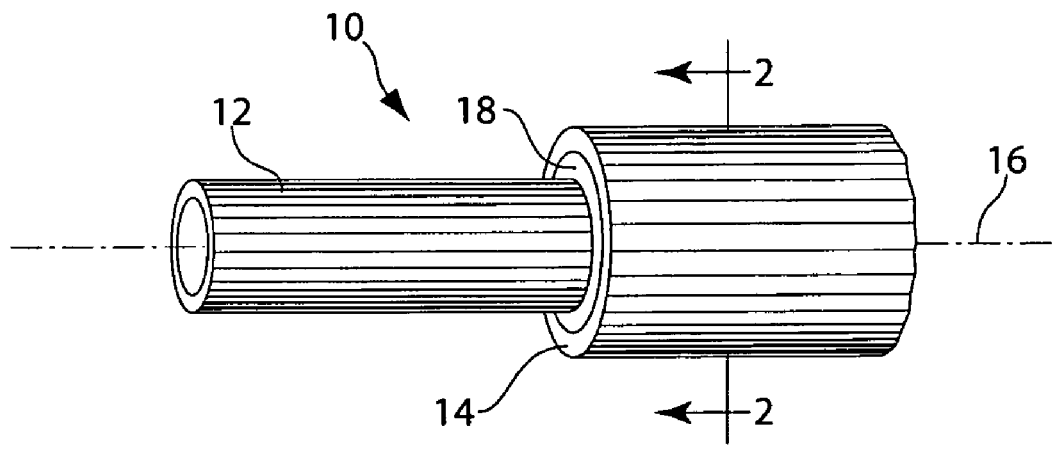
FIG. 1 is a perspective view, partially broken away, of an exemplary composite tube including an interior liner, a tie-layer, and a composite layer.

The present disclosure relates in part to a composite that includes at least one layer of a polyolefin material covalently bonded through a tie-layer to at least one layer of a non-polyolefin.

Definitions

For convenience, before further description, certain terms employed in the specification, examples, and appended claims are collected here. These definitions should be read in light of the reminder of the disclosure and understood as by a person of skill in the art.

The articles "a" and "an" are used herein to refer to one or to more than one (i.e. to at least one) of the grammatical object of the article. By way of example, "an element" means one element or more than one element.

The term "aliphatic" is an art-recognized term and includes linear, branched, and cyclic alkanes, alkenes, or alkynes. In certain embodiments, aliphatic groups in the present disclosure are linear or branched and have from 1 to about 20 carbon atoms.

The term "alkyl" is art-recognized, and includes saturated aliphatic groups, including straight-chain alkyl groups, branched-chain alkyl groups, cycloalkyl (alicyclic) groups, alkyl substituted cycloalkyl groups, and cycloalkyl substituted alkyl groups. In certain embodiments, a straight chain or branched chain alkyl has about 30 or fewer carbon atoms in its backbone (e.g., C1-C30 for straight chain, C3-C30 for branched chain), and alternatively, about 20 or fewer. Likewise, cycloalkyls have from about 3 to about 10 carbon atoms in their ring structure, and alternatively about 5, 6 or 8 carbons in the ring structure.

Moreover, the term "alkyl" (or "lower alkyl") includes both "unsubstituted alkyls" and "substituted alkyls", the latter of which refers to alkyl moieties having substituents replacing a hydrogen on one or more carbons of the hydrocarbon backbone. Such substituents may include, for example, a halogen, a hydroxyl, a carbonyl (such as a carboxyl, an alkoxycarbonyl, a formyl, or an acyl), a thiocarbonyl (such as a thioester, a thioacetate, or a thioformate), an alkoxyl, a phosphoryl, a phosphonate, a phosphinate, an amino, an amido, an amidine, an imine, a silyl, a cyano, a nitro, an azido, a sulfhydryl, an alkylthio, a sulfate, a sulfonate, a sulfamoyl, a sulfonamido, a sulfonyl, a heterocyclyl, an aralkyl, or an aromatic or heteroaromatic moiety. It will be understood by those skilled in the art that the moieties substituted on the hydrocarbon chain may themselves be substituted, if appropriate. For instance, the substituents of a substituted alkyl may include substituted and unsubstituted forms of amino, azido, imino, amido, phosphoryl (including phosphonate and phosphinate), sulfonyl (including sulfate, sulfonamido, sulfamoyl and sulfonate), and silyl groups, as well as ethers, alkylthios, carbonyls (including ketones, aldehydes, carboxylates, and esters), —$CF_3$, —CN and the like. Exemplary substituted alkyls are described below. Cycloalkyls may be further substituted with alkyls, alkenyls, alkoxys, alkylthios, aminoalkyls, carbonyl-substituted alkyls, —$CF_3$, —CN, and the like.

The term "aralkyl" is art-recognized, and includes alkyl groups substituted with an aryl group (e.g., an aromatic or heteroaromatic group).

The terms "alkenyl" and "alkynyl" are art-recognized, and include unsaturated aliphatic groups analogous in length and possible substitution to the alkyls described above, but that contain at least one double or triple bond respectively.

Unless the number of carbons is otherwise specified, "lower alkyl" refers to an alkyl group, as defined above, but having from one to ten carbons, alternatively from one to about six carbon atoms in its backbone structure. Likewise, "lower alkenyl" and "lower alkynyl" have similar chain lengths.

The term "heteroatom" is art-recognized, and includes an atom of any element other than carbon or hydrogen. Illustrative heteroatoms include boron, nitrogen, oxygen, silicon, phosphorus, sulfur and selenium, and alternatively oxygen, nitrogen or sulfur.

The term "aryl" is art-recognized, and includes 5-, 6- and 8-membered single-ring aromatic groups that may include from zero to four heteroatoms, for example, benzene, pyrrole, furan, thiophene, imidazole, oxazole, thiazole, triazole, pyrazole, pyridine, pyrazine, pyridazine and pyrimidine, and the like. Those aryl groups having heteroatoms in the ring structure may also be referred to as "aryl heterocycles" or "heteroaromatics." The aromatic ring may be substituted at one or more ring positions with such substituents as described above, for example, halogen, azide, alkyl, aralkyl, alkenyl, alkynyl, cycloalkyl, hydroxyl, alkoxyl, amino, nitro, sulfhydryl, imino, amido, phosphonate, phosphinate, carbonyl, carboxyl, silyl, ether, alkylthio, sulfonyl, sulfonamido, ketone, aldehyde, ester, heterocyclyl, aromatic or heteroaromatic moieties, —CF3, —CN, or the like. The term "aryl" also includes polycyclic ring systems having two or more cyclic rings in which two or more carbons are common to two adjoining rings (the rings are "fused rings") wherein at least one of the rings is aromatic, e.g., the other cyclic rings may be cycloalkyls, cycloalkenyls, cycloalkynyls, aryls and/or heterocyclyls.

The terms "heterocyclyl" and "heterocyclic group" are art-recognized, and include 3- to about 10-membered ring structures, such as 3- to about 8-membered rings, whose ring structures include one to four heteroatoms. Heterocycles may also be polycycles. Heterocyclyl groups include, for example, thiophene, thianthrene, furan, pyran, isobenzofuran, chromene, xanthene, phenoxathiin, pyrrole, imidazole, pyrazole, isothiazole, isoxazole, pyridine, pyrazine, pyrimidine, pyridazine, indolizine, isoindole, indole, indazole, purine, quinolizine, isoquinoline, quinoline, phthalazine, naphthyridine, quinoxaline, quinazoline, cinnoline, pteridine, carbazole, carboline, phenanthridine, acridine, pyrimidine, phenanthroline, phenazine, phenarsazine, phenothiazine, furazan, phenoxazine, pyrrolidine, oxolane, thiolane, oxazole, piperidine, piperazine, morpholine, lactones, lactams such as azetidinones and pyrrolidinones, sultams, sultones, and the like. The heterocyclic ring may be substituted at one or more positions with such substituents as described above, as for example, halogen, alkyl, aralkyl, alkenyl, alkynyl, cycloalkyl, hydroxyl, amino, nitro, sulfhydryl, imino, amido, phosphonate, phosphinate, carbonyl, carboxyl, silyl, ether, alkylthio, sulfonyl, ketone, aldehyde, ester, a heterocyclyl, an aromatic or heteroaromatic moiety, —CF3, —CN, or the like.

The terms "polycyclyl" and "polycyclic group" are art-recognized, and include structures with two or more rings (e.g., cycloalkyls, cycloalkenyls, cycloalkynyls, aryls and/or heterocyclyls) in which two or more carbons are common to two adjoining rings, e.g., the rings are "fused rings". Rings that are joined through non-adjacent atoms, e.g., three or more atoms are common to both rings, are termed "bridged" rings. Each of the rings of the polycycle may be substituted with such substituents as described above, as for example, halogen, alkyl, aralkyl, alkenyl, alkynyl, cycloalkyl, hydroxyl, amino, nitro, sulfhydryl, imino, amido, phosphonate, phosphinate, carbonyl, carboxyl, silyl, ether, alkylthio, sulfonyl, ketone, aldehyde, ester, a heterocyclyl, an aromatic or heteroaromatic moiety, —CF3, —CN, or the like.

The term "carbocycle" is art recognized and includes an aromatic or non-aromatic ring in which each atom of the ring is carbon.

The following art-recognized terms have the following meanings: "nitro" means —NO2; the term "halogen" designates —F, —Cl, —Br or —I; the term "sulfhydryl" means —SH; the term "hydroxyl" means —OH; the term silyl means —SiR3 where R here can be H, halogen, and the term "sulfonyl" means —SO2—.

The terms "alkoxyl" or "alkoxy" are art-recognized and include an alkyl, aralkyl, aryl, heterocyclyl, polycyclyl, and carbocycle groups, as defined above, having an oxygen atom attached thereto. Representative alkoxyl groups include methoxy, ethoxy, propyloxy, tert-butoxy, benzyloxy, phenoxy, and the like. An "ether" is two hydrocarbons covalently linked through an oxygen.

The term "hydrocarbon" is art-recognized and refers to all permissible compounds having at least one hydrogen and one carbon atom. For example, permissible hydrocarbons include acyclic and cyclic, branched and unbranched, carbocyclic and heterocyclic, aromatic and nonaromatic organic compounds that may be substituted or unsubstituted.

The term 'polyolefin' refers to a substance that comprises polymerized olefin. A polyolefin segment includes at least one monomer of a polyolefin.

The term 'olefin' refers to unsaturated, aliphatic hydrocarbons. The unsaturated, aliphatic hydrocarbons may be substituted or unsubstituted.

The term 'tie-layer' refers to a layer of material which bonds two dissimilar materials.

The term 'coupling agent' refers to a substance that joins one moiety to another. The moiety may be inorganic or organic.

The term "substituted" is art-recognized and refers to all permissible substituents of organic or inorganic compounds. In a broad aspect, the permissible substituents include acyclic and cyclic, branched and unbranched, carbocyclic and heterocyclic, aromatic and nonaromatic substituents of organic or inorganic compounds. Illustrative substituents include, for example, those described herein above. The permissible substituents may be one or more and the same or different for appropriate organic compounds. For purposes of this disclosure, the heteroatoms such as silicon may have hydrogen substituents, halogen substituents, and/or any permissible substituents of organic or inorganic compounds described herein which satisfy the valences of the heteroatoms. This disclosure is not intended to be limited in any manner by the permissible substituents of organic or inorganic compounds.

It will be understood that "substitution" or "substituted with" includes the implicit proviso that such substitution is in accordance with permitted valence of the substituted atom and the substituent, and that the substitution results in a stable compound, e.g., which does not spontaneously undergo transformation such as by rearrangement, cyclization, elimination, or other reaction.

The definition of each expression, e.g. alkyl, m, n, R, X, etc., when it occurs more than once in any structure, is intended to be independent of its definition elsewhere in the same structure unless otherwise indicated expressly or by the context.

Contemplated equivalents of the subject compounds and compositions described herein include such materials which otherwise correspond thereto, and which have the same general properties thereof (e.g., a thermoplastic), wherein one or more simple variations of substituents are made which do not adversely affect the efficacy of such molecule to achieve its intended purpose. In general, the compounds of the present disclosure may be prepared by the methods illustrated in the general reaction schemes as, for example, described below, or by modifications thereof, using readily available starting materials, reagents and conventional synthesis procedures. In these reactions, it is also possible to make use of variants which are in themselves known, but are not mentioned here.

A polyolefin includes, for example, polyethylene, polypropylene, polybutylene, polystyrene or cross-linked polyethylene (PEX or XLPE), or copolymers, terpolymers, polymer blends, or alloys incorporating at least one of these polyolefins. A polyolefin may also include vinyl polymers such as polyvinylchloride, polyvinylalcohol, polyvinylacetate, polyvinylidene diflouride and other halogenated or fluorinated thermoplastics. In some embodiments, a polyolefin may be a thermoplastic. In one exemplary embodiment, a polyolefin may be part or all of a liner material in a composite tube, a layer within a composite tube, or a layer outside of a composite tube.

A non-polyolefin may include for example, a thermoplastic, elastomer, thermoplastic elastomer, thermoset, metal, metal oxide, or a ceramic, or combinations of these materials. A non-polyolefin may also include thermosetting or thermoplastic matrix materials such as a polyester, vinylester, bismaleimide, epoxy, urethane, polyamide, polyimide or cyanate ester resins, or combinations of these. In one embodiment, non-polyolefins that may be used as part of a composite are, at least in part, hydrolytically stable materials such as, for example, amine-cured epoxies, catalytically-cured epoxies, ether-based urethanes, polyethers, polyphenylene sulfide, polyetheretherketone, polyphenylene oxide, polyetherimides, bismaleimide resins, and polyimide resins. In one embodiment, a non-polyolefin may be a fiber-matrix material in a composite tube.

The polyolefins and/or non-polyolefins may be optically active. The present disclosure contemplates all such compounds, including cis- and trans-isomers, R- and S-enantiomers, diastereomers, (d)-isomers, (l)-isomers, the racemic mixtures thereof, and other mixtures thereof, as falling within the scope of the disclosure. Additional asymmetric carbon atoms may be present in a substituent such as an alkyl group. All such isomers, as well as mixtures thereof, are intended to be included in this disclosure.

The polyolefins and/or the non-polyolefins may be provided as copolymers, polymer blends, polymer alloys, or terpolymers, or polymers with more than three species of monomers. The polyolefins and/or the non-polyolefins may also include further subunits. These polymers may be obtained from chemical suppliers or synthesized from monomers obtained from these suppliers using standard techniques. In certain embodiments, these polymers are comprised almost entirely, if not entirely, of the same subunit. In other embodiments, the polymers may be copolymers, in which different subunits and/or other monomeric units are incorporated into the polymer. In certain instances, the polymers are random copolymers, in which the different subunits and/or other monomeric units are distributed randomly throughout the polymer chain. The polyolefins and/or the non-polyolefins may contain organic or inorganic fillers, modifiers, fire-retardants, permeation reducing additives, wetting agents, toughening agents, flexibilizers, stabilizers, diluents, flame retardants, thixotropes, impurities, extenders and other additives.

In other embodiments, the different types of monomeric units are distributed randomly throughout the chain. In part, the term "random" is intended to refer to the situation in which the particular distribution or incorporation of monomeric units in a polymer that has more than one type of monomeric units is not directed or controlled directly by the synthetic protocol, but instead results from features inherent to the polymer system, such as the reactivity, amounts of subunits and other characteristics of the synthetic reaction or other methods of manufacture, processing or treatment.

A polymer such as a polyolefin may have a chain terminating group, by which the polymer terminates. Examples of such chain terminating groups include alcohols and amines, or other organic or inorganic moieties.

The ratio of different subunits in a polymer may vary. Alternatively, in other instances, the polymers are effectively composed of two different subunits, in which the ratio of the subunits may vary from less than 1:99 to more than 99:1, or alternatively 10:90, 15:85, 25:75, 40:60, 50:50, 60:40, 75:25, 85:15, 90:10 or the like.

A tie-layer may comprise a chemically-modified polyolefin. The tie-layer may be a discrete layer, or it may be connected to a polyolefin, e.g. bonded, melted, or fused to a polyolefin. For example, a chemically-modified polyolefin may be formed by copolymerization of an olefin, with a reactive species or by adding a reactive species onto the preformed polyolefin backbone. These methods may be used with, for example, silane-grafted PEX-b materials such as Monosil, Sioplas, or the like prior to, or after, crosslinking the PEX-b material by, for example, exposure to water. A tie-layer may be a chemically-modified polyolefin joining a polyolefin liner, layer, or outer jacket, to fiber-matrix of a composite tube which comprises a non-polyolefin.

In another embodiment, a tie-layer may comprise a chemically-modified polyolefin that has been further modified by a secondary reaction. A chemically-modified polyolefin may be modified, for example, by reacting a secondary species onto the preformed polyolefin backbone. A secondary reaction includes reactions that bond a coupling agent with a new and/or different reactive group to the chemically modified polyolefin. A chemically-modified polyolefin may contain a reactive silicon-based moiety. In another embodiment, a coupling agent may contain a silicon-based moiety. For example, when a coupling agent contains a silicon-based moiety, new or different reactive groups that may not tolerate conditions needed for initial polymerization of the chemically modified polyolefin may be added to the chemically modified polyolefin.

For example, the tie-layer may be formed by reacting or compounding a silicon-modified polyolefin with a silane coupling agent. The silicon modified polyolefin may be formed by copolymerizing or grafting a silicon-containing or silicon-terminated group into the backbone or pendent to the backbone of the polyolefin polymer. The silicon-containing or silicon terminated group may include, for example, silane, silicone, siloxy, silylalkoxy, silazane, siloxirane or silsesquioxane moieties. These moieties may be substituted with other atoms or organic or inorganic groups. Silicon modified polyolefins may include a Sioplas or PEX-b material.

The silane coupling agent may contain at least one functional group that is reactive toward the silicon-based group of a silicon-modified polyolefin and at least one functional group that is reactive towards a non-polyolefin. The silane coupling agent may contain multiple silicon atoms or moieties and/or may contain multiple functional groups that are reactive towards a polyolefin. The silane coupling agent may be attached to the silicon-modified polyolefin through typical silicon coupling reactions such as, but not limited to, condensation, dehydrocoupling, or addition reactions. In one embodiment, the silane coupling agent may be attached to a silicon modified polyolefin by hydrolysis of the silane and silicon modified polyolefin followed by condensation reaction of two different silicon-based groups. In this manner, functional groups that could not tolerate the initial polymerization or grafting conditions may be added to the modified polyolefin in a second step under milder reaction conditions, such as, for example, hydrolysis and condensation. The group on the silane coupling agent that is reactive toward the non-polyolefin may then be used to bond the non-polyolefin to the tie-layer.

A silicon modified polyolefin may be any polyolefin comprising a silicon atom or moiety. The silicon modified polyolefin may include a silicon atom or a silicon moiety within the polyolefin backbone, or it may include a silicon moiety pendantly attached to the polyolefin, or the silicon modified polyolefin may have both a silicon moiety pendantly attached and a silicon atom or a silicon moiety within the polyolefin backbone. A single pendent group may have multiple silicon atoms or moieties.

One exemplary reaction scheme is shown below:

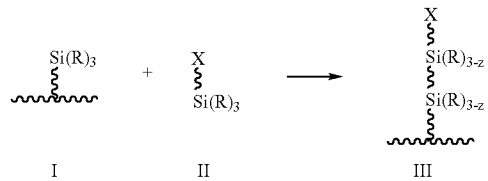

Formula I represents a silicon-modified polyolefin, where the horizontal wavy line ∼∼∼ represents a polyolefin or a polyolefin segment. Formula II represents a silane coupling agent, and Formula III represents a tie-layer material formed by reacting I with II. R may be independently selected from any number of organic and inorganic units, and z may be any number from 1 to 3, reflecting that the number of linkages between the silicon atoms may vary. The vertical wavy lines between atoms may represent single bonds, multiple bonds, an atom or atoms, or organic or inorganic moieties, joined by single or multiple bonds.

X may be a moiety that is reactive toward a non-polyolefin, such as, for example, amine or amine derivatives, nitrile, hydroxyl, vinyl, sulfide, disulphide, epoxy, methacryl, acryl, isocyanato, mercapto, cyanato, thiocyanato, isocyanato, or the like. There may be more than one X group on the silane coupling agent. The number and position of the $Si(R)_{3-z}$ and X groups along the silicon modified polyolefin may vary. In another exemplary embodiment, X may be a moiety that bonds, or is capable of bonding to a silicon modified polyolefin to a non-polyolefin. The number and position of the X moieties in a silane coupling agent may vary.

For example, a polyolefin can be modified by a silicon moiety so that a silicon modified polyolefin can be represented by:

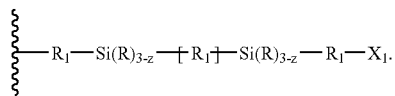

The wavy line ~~~ represents a polyolefin segment, $R_1$ each independently represents an organic or inorganic moiety or a bond; R each independently represents an organic or inorganic moiety; and $X_1$ independently represents an organic or inorganic moiety. $X_1$ may include at least one moiety that is capable of bonding to a non-polyolefin. For example, $X_1$ may include vinyl, epoxy or amine moieties. The integer z represents the number of linkages between the $Si(R)_{3-z}$ moieties, and can be 1, 2, or 3.

R may be each independently selected from the group consisting of alkyl, alkenyl, alkynyl, alkoxy, hydroxyl, aralkyl, aryl, heterocyclyl, polycyclyl, carbocycles, heteroatoms, halogens, and hydrogen.

$R_1$ may each be independently selected from the group consisting of alkyl, alkenyl, alkynyl, alkoxy, hydroxyl, aralkyl, aryl, heterocyclyl, polycyclyl, carbocycles, heteroatoms, halogens, a bond, hydrogen or the like. For example, some $R_1$ moieties may be represented by a moiety $-O-R_3$, where $R_3$ may be independently selected from the group consisting of alkyl, alkenyl, alkynyl, alkoxy, aralkyl, aryl, heterocyclyl, polycyclyl, carbocycles, heteroatoms, or a bond.

For example, a polyolefin may be modified as shown below:

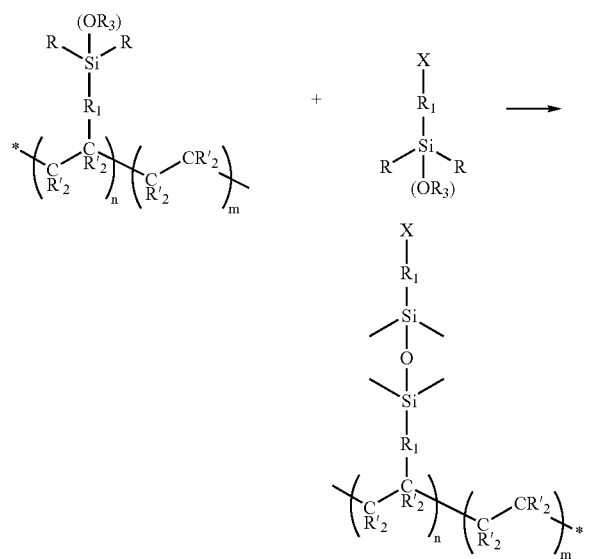

In this exemplary example, the ratio of n to m may vary from 1:0 to 1:1000. The ratio of unreacted silicon groups on the backbone to silane-coupled groups on the polymer backbone may be varied from 0:1 to 1:1000 to allow for or inhibit subsequent crosslinking of the modified polyolefin through the silicon-based units, which may produce, for example, either a thermoplastic or thermoset tie-layer material. The amount of silane coupling agent added to the polyolefin may be varied from 0.01 to 90% by weight.

The $R'_2$ moieties on the polyolefin may each be independently selected from the group consisting of alkyl, alkenyl, alkynyl, alkoxy, hydroxyl, aralkyl, aryl, heterocyclyl, polycyclyl, carbocycles, heteroatoms, halogens, hydrogen, or the like, or may each be independently selected from other organic or inorganic moieties.

Exemplary $-O-R_3-$ moieties include alkoxy, hydroxyl, hydrogen, halogen, acetyl, alkyl ether, or arylether. The number or type of linkages between the silicon atoms in a silicon-modified polyolefin may change by, for example, varying the ratio of R to $-O-R_3-$. For example, the ratio of R to $-O-R_3-$ may vary from about 0:3 to about 3:0.

For example, trimethoxyvinylsilane-grafted PEX-b material may be compounded with the silane coupling agent gamma-propylglycidyltrimethoxysilane. Subsequent exposure to water with or without the appropriate catalyst hydrolyzes the silyl-alkoxy bonds that then condense to produce an epoxy-modified polyethylene material.

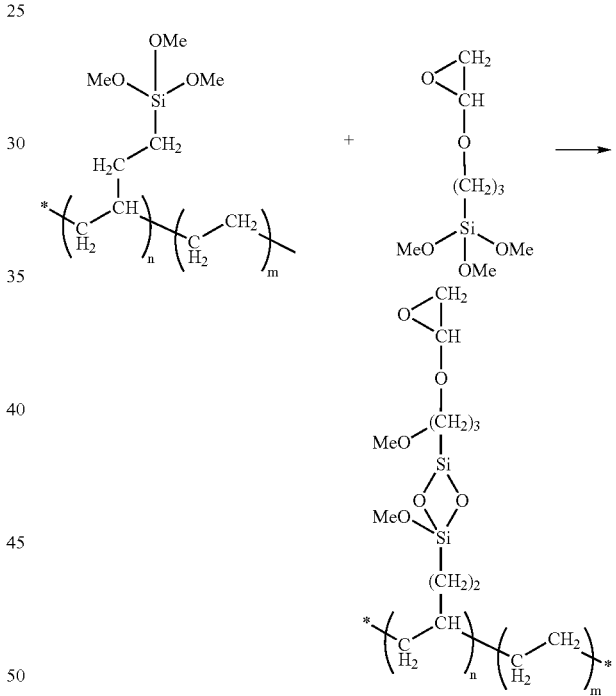

The above example shows two linkages between the silicon atoms. One of skill in the art would recognize that the number of linkages may vary from one to three as the coupling and hydrolysis reaction progresses. For example, the average number of linkages may be about 2.5. One or more of the unreacted $-O-Me$ groups may also be hydrolyzed to OH groups by, for example, exposure to water. The ratio of n to m may vary from 1:0 to 1:10000.

For example, the amount of gamma-propylglycidyltrimethoxysilane added to the PEX-b may vary from 0.01 to 90% by weight. In this example, the ratio of gamma-propylglycidyltrimethoxysilane to trimethoxyvinylsilane groups on the polymer backbone may be varied from 1:1 to 1:1000 to allow for or inhibit subsequent crosslinking of the polyolefin through the vinylsilane units, controllably producing either a thermoplastic or thermoset tie-layer material. The epoxy-modified polyethylene may then be reacted with common epoxy-based resins and curing agents to yield a chemical bond between the epoxy-modified polyethylene and the non-polyolefin.

Other common silane coupling agents, such as aminopropyltrimethoxysilane, which have increased reactivity, can be chosen to allow for preferential coupling with the vinylsilane units of the modified polyethylene in comparison to vinylsilane units of adjacent vinyl silane-grafted polyethylene molecules. Bifunctional disilane coupling agents may be used to allow for crosslinking of the PEX-b material while also inserting a reactive moiety for later bonding to a non-polyolefin. Examples of these silane coupling agents include but are not limited to vinyltrichlorosilane, vinyltrimethoxysilane, vinyltriethoxysilane, 2-(3,4 epoxycyclohexyl)-ethyltrimethoxysilane, 3-glycidoxypropyltrimethoxysilane, 3-glycidoxypropylmethyldiethoxysilane, 3-glycidoxypropyltriethoxysilane, 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, N-2(aminoethyl)3-aminopropylmethyldimethoxysilane, N-2(aminoethyl)3-aminopropyltrimethoxysilane, N-2(aminoethyl)3-aminopropyltriethoxysilane, 3-aminopropyltrimethoxysilane, 3-aminopropyltriethoxysilane, 3-triethoxysilyl-N-(1,3-dimethyl-butyliden)propylamine, N-phenyl-3-aminopropyltrimethoxysilane, N-(vinylbenzyl)-2-aminoethyl-3-aminopropyltrimethoxysilane hydrochloride, 3-ureidopropyltriethoxysilane, 3-chloropropyltrimethoxysilane, 3-mercaptopropylmethyldimethoxysilane, 3-mercaptopropyltrimethoxysilane, bis(triethoxysilylpropyl)tetrasulfide, 3-isocyanatepropyltriethoxysilane, aminopropyltriethoxysilane, aminopropyltrimethoxysilane, aminopropylmethyldiethoxysilane, aminopropylmethyldimethoxysilane, aminoethylaminopropyltrimethoxysilane, aminoethylaminopropyltriethoxysilane, aminoethylaminopropylmethyldimethoxysilane, diethylenetriaminopropyltrimethoxysilane, diethylenetriaminopropyltriethoxysilane, diethylenetriaminopropylmethyldimethoxysilane, diethylenetriaminopropylmethyldiethoxysilane, cyclohexylaminopropyltrimethoxysilane, hexanediaminomethyldiethoxysilane, anilinomethyltrimethoxysilane, anilinomethyltriethoxysilane, diethylaminomethyltriethoxysilane, diethylaminomethyl)methyldiethoxysilane, methylaminopropyltrimethoxysilane, bis(triethoxysilylpropyl)tetrasulfide, bis(triethoxysilylpropyl)disulfiden, mercaptopropyltrimethoxysilane, mercaptopropyltriethoxysilane, mercaptopropylmethyldimethoxysilane, 3-thiocyantopropyltriehtoxysilane, glycidoxypropyltrimethoxysilane, glycidoxypropyltriethoxysilane, glycidoxypropylmethyldiethoxysilane, glycidoxypropylmethyldimthoxysilane, methacryloxypropyltrimethoxysilane, methacryloxypropyltriethoxysilane, methacryloxypropylmethyldimethoxysilane, chloropropyltrimethoxysilane, chloropropyltriethoxysilane, chloromethyltriethoxysilane, chloromethyltrimethoxysilane, dichloromethyltriethoxysilane, vinyltrimethoxysilane, vinyltriethoxysilane, vinyltris (2-methoxyethoxy)silane, siloxane, silicone, silicone resins, or other silicone containing monomers, oligomers, polymers, or resins. Silane coupling agents may also include silazanes, polysilazanes, silsesquioxanes, polysilanes, and polycarbosilanes. Silane coupling agents include those listed in the Gelest Catalog 2000, Gelest, Inc., hereby incorporated by reference in its entirety. These materials are, for example, commercially available from companies such as Gelest, Huls, Degussa, Witco, OSi Specialties Uniroyal, UC, and others.

The silane coupling agent may added to the silicon-modified polyolefin by ways known to those skilled in the art, such as spray, dip, immersion, or solvent-based surface coatings; liquid or solid addition compounding; or by spray or adsorption onto solid substrates including inorganic solids or porous polyolefin pellets followed by subsequent compounding or extrusion with the silicon-modified polyolefin. These processes may be carried out prior to or during the tie-layer forming process. In an embodiment, low molecular weight additives such as silane coupling agents may, for example, preferentially migrate to the surface of polymeric materials during or following extrusion, thereby creating a coupling agent-rich surface.

The tie-layer forming processes may include but are not limited to extrusion, blow molding, rotational molding, injection molding, pultrusion, wet, powder, and melt forming processes. Alternatively, the silane coupling agent may be added to the non-polyolefin.

Examples and details about application methods are included, for example, in the Gelest, Inc. document "Applying a Silane Coupling Agent", electronic library "09Apply.pdf", as well as D. Leyden, W. Collins, "Symposium and Silylated Surfaces" Gordon & Breach 1980; Gelest Catalog 2000, Gelest, Inc.; B. Arkles, "Tailoring Surfaces with Silanes" Chemtech 7, 766 (1977); E. P. Plueddemann, "Silane Coupling Agents" Plenum N.Y. 1982; K. L. Mittal "Silanes and Other Coupling Agents" VSP, 1992, as well as the references therein, all of which are herein incorporated by reference in their entirety. Additional information on the chemistry, selection, practical and theoretical considerations may be found in S. S. Weng, S. W. Mun, S. Y. Cheong, S. Y. Leong, L. A Kwong "Short Notes #5 (Revised), Silane Coupling Agents", $2^{nd}$ Ed., Nov. 9, 2000, herein incorporated by reference in its entirety. The tie-layer may be formed in the same process as the polyolefin or may be formed concurrently with the polyolefin.

The tie-layer may be joined to the polyolefin by methods known to those skilled in the art including, for example, laminating, extrusion, co-extrusion, sequential extrusion, tape winding, wet, powder, co-injection molding or melt coating. The tie-layer may be joined to the polyolefin by a number of fusion methods known to those skilled in the art including thermal, radiative, or electrofusion methods. It may be desirable to further treat the resulting composite article with, for example, heat and pressure. Alternatively, a reaction between the coupling agent and the chemically modified polyolefin may take place after the tie-layer is joined to the polyolefin, thereby generating a tie-layer in situ.

Any of the composites contemplated by this disclosure can be provided, for example, in the form of a sheet or film or multi-layered tubing or hose or other shaped article regardless of the specific embodiments disclosed. Further, the order of the layers may be reversed in any of these embodiments. Determination of what comprises an inner or outer layer may be influenced by desired barrier properties and/or chemical or temperature resistant properties.

This disclosure also provides for a tube comprising a composite that includes an internal, substantially fluid impervious polyolefin liner connected, with a tie-layer, to a composite layer of fibers embedded in a non-polyolefin matrix surrounding the internal liner.

In accordance with another exemplary embodiment, a tube is provided that comprises a composite that includes an internal, substantially fluid impervious liner and a composite layer of fibers embedded in a non-polyolefin matrix surrounding the internal liner, and includes a substantially fluid impervious layer within the composite layer or outside of the composite layer. Either or both substantially fluid impervious layers may be polyolefins. Either or both substantially fluid impervious barriers may be connected to the composite through a tie-layer.

Figure 2:
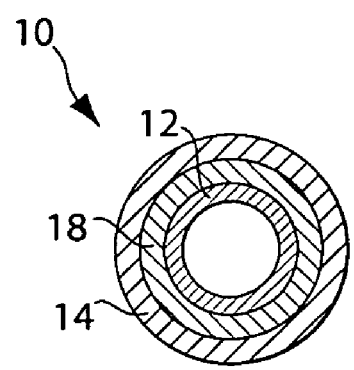
FIG. 2 is a side view in cross-section of the composite tube of FIG. 1.

Referring to FIGS. 1-2, an exemplary composite tube 10 constructed of an inner liner 12, and a composite layer 14 is illustrated. The composite tube 10 is generally formed along a longitudinal axis 16 and can have a variety of cross-sectional shapes, including circular, oval, rectangular, square, polygonal, and the like. A tie-layer 18, such as a tie-layer described herein, may connect the inner liner 12 and the composite layer 14. The illustrated tube 10 has a circular cross-section. A composite tube comprising a tie-layer as disclosed herein can generally be constructed in manner analogous to one or more of the composite tubes described in commonly owned U.S. Pat. Nos. 6,016,845, 5,921,285, 6,148,866, 6,004,639, and pending application U.S. Ser. Nos. 10/134,971 and 10/134,660. Each of the aforementioned patents is incorporated herein by reference.

The liner 12 serves as a fluid containment and gas barrier member to resist leakage of internal fluids from the composite tube 10. The liner 12 may be constructed from polymeric materials such as thermoplastics (e.g polyolefins) and thermoset polymers, but may also be elastomeric or metallic or a heat-shrinkable material. The liner 12 may also include fibers or additives to increase the load carrying strength of the liner and the overall load carrying strength of the composite tube.

The composite layer 14 can be formed of one or more plies, each ply having one or more fibers disposed within a matrix, such as a polymer, or resin (e.g. a non-polyolefin). The matrix may have a tensile modulus of elasticity of at least about 690 MPa (100,000 psi) and a glass transition temperature of at least about 50° C., or at least about 82° C. (180° F.). In addition, the matrix may have a maximal tensile elongation greater than or equal to about 2%. The tensile modulus rating and the tensile elongation rating are generally measured at approximately 20° C. (68° F.). The fiber material and orientation can be selected to provide the desired mechanical characteristics for the composite layer 14 and the composite tube 10. Additional composite layers or other layers beyond the composite layer 14, such as a wear resistant layer or a pressure barrier layer, may also be provided interior or exterior to the composite layer to enhance the capabilities of the composite tube 10. Additional optional layers may include a thermal insulation layer to maintain the temperature of fluid carried by the composite tube 10 within a predetermined temperature range, a crush resistant layer to increase the hoop strength of the composite tube, and/or a layer of low density or high density material to control the buoyancy of selected lengths of the composite tube. Composite tubes including such optional layers are described in commonly-owned U.S. Ser. No. 10/134,971, hereby incorporated by reference. Moreover, the composite tube may include one or more optional permeation or diffusion barriers and optional adhesive layers for bonding to the permeation or diffusion barrier to another layer of the composite tube. Composite tubes including permeation or diffusion barriers, adhesive layers, additional optional features for controlling the permeation of fluids through the walls of the composite tube are disclosed in commonly owned U.S. Provisional Application No. 60/337,848 filed Nov. 5, 2001, hereby incorporated by reference. Two or more adjacent layers of the composite tube may be connected together by a tie-layer as disclosed herein.

The composite tube 10 may optionally include one or more energy conductors within the composite tube. In addition, sensors optionally may be provided within the composite tube 10 to monitor the condition of the tube and/or conditions of the fluid transported by the composite tube 10.

EXEMPLIFICATION

Example 1

A tie-layer material is produced by compounding a preformed silane-grafted polyethylene (Sioplas or PEX-b), with a starting composition of 1.5% by weight vinyl silane, with 1.5% by weight of aminopropyltrimethoxysilane via liquid addition using a twin screw extruder. The aminopropyltrimethoxysilane is then reacted to the silane in the extruded material using 100% humidity at 90 C in the presence of a tin compound to produce a partially thermoplastic amine-modified polyethylene. The tie-layer is then coextruded with polyethylene to produce a reactive layer on top of the polyethylene material. This tie-layer is then reacted with non-polyolefins to form a composite structure.

Example 2

A tie-layer material is produced by compounding a preformed silane-grafted polyethylene (PEX-b), with a starting composition of 1.5% by weight vinyl silane, with 1.5% by weight of aminopropyltrimethoxysilane via liquid addition using a twin screw extruder. The compounded material is then coextruded with polyethylene to produce a reactive layer on top of the polyethylene material. The compounded material is then reacted exposed to 100% humidity at 90 C in the presence of dibutyltindilaurate to produce a partially thermoplastic amine-modified polyethylene tie-layer in situ.

Example 3

A tie-layer is produced by compounding a preformed silane-grafted polyethylene (PEX-b), with a starting composition of 5% by weight vinyl silane, with 3.5% by weight of gamma-propylglycidyltrimethoxysilane added by adsorption onto porous polyethylene pellets followed by compounding in a single screw extruder during the coextrusion of a Sioplas material with the tie-layer. The gamma-propylglycidyltrimethoxysilane is then reacted to the vinyl silane in the tie-layer material using 100% humidity at 90 C in the presence of dioctyltindilaurate to produce a thermoset epoxy-modified cross-linked polyethylene tie-layer on top of the Sioplas material.

Example 4

A tie-layer material is produced on a preformed silane-grafted polyethylene (Sioplas or PEX-b) tube by dissolving 5% by weight aminopropyltrimethoxysilane in anhydrous xylene. The silane grafted polyethylene liner is drawn through the silane/xylene bath at 80 C. The solvent is evaporated and the aminopropyltrimethoxysilane is then reacted to the vinyl silane by moisture under ambient conditions to create an amine-modified surface on the silane-grafted polyethylene liner for composite tubing. This liner may be bonded to thermosetting epoxy matrix materials to form a hydrolytically stable bond between the liner and the composite.

Example 5

A tie-layer material is produced on a preformed silane-grafted polyethylene (Sioplas or PEX-b) tube by adding 10% by weight gamma-propylglycidyltrimethoxysilane to a fiber-matrix resin prior to polymerization or curing of the resin. The silane-grafted polyethylene is reacted with the gamma-propylglycidyltrimethoxysilane by hydrolysis and condensation of the silane groups prior to, concurrent, or after curing of the matrix resin, thereby generating the tie-layer in-situ.

Equivalents

While specific embodiments of the subject disclosure have been discussed, the above specification is illustrative and not restrictive. Many variations of the disclosure will become apparent to those skilled in the art upon review of this specification. The full scope of the disclosure should be determined by reference to the claims, along with their full scope of equivalents, and the specification, along with such variations.

Unless otherwise indicated, all numbers expressing quantities of ingredients, reaction conditions, parameters, descriptive features and so forth used in the specification and claims are to be understood as being modified in all instances by the term "about." Accordingly, unless indicated to the contrary, the numerical parameters set forth in this specification and attached claims are approximations that may vary depending upon the desired properties sought to be obtained by the present invention.

All publications and patents mentioned herein, including those items listed below, are hereby incorporated by reference in their entirety as if each individual publication or patent was specifically and individually indicated to be incorporated by reference. In case of conflict, the present application, including any definitions herein, will control.

What is claimed is:

1. A composite article comprising a polyolefin layer, a tie-layer, and a non-polyolefin, wherein said tie-layer comprises:

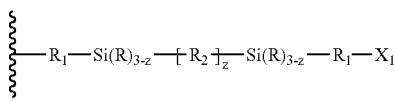

wherein ᴧᴧᴧ represents a polyolefin segment;
$R_1$ independently for each occurrence represents bivalent organic moiety or a bond;
$R_2$ independently for each occurrence represents bivalent organic moiety, or a bond;
R is selected independently for each occurrence from the group consisting of H, alkyl, alkenyl, alkynl, halogen, aralkyl, aryl, polycyclyl, and carbocycles;
$X_1$ independently for each occurrence represents a moiety that is capable of bonding to said non-polyolefin by a chemical reaction; and
z represents the number of linkages between the $Si(R)_{3-z}$ moieties, and is an integer from 1 to 3.

2. The composite article of claim 1, wherein for each occurrence, $R_1$ and $R_2$ and are selected independently from the group of consisting of alkyl, alkenyl, and alkynyl, —O—, alkoxy, aryl, polycyclyl, carbocycles, and a bond.

3. The composite article of claim 2, wherein z is 1.

4. The composite article of claim 2, wherein z is 2.

5. The composite article of claim 2, wherein z is 3.

6. The composite article of claim 1, wherein $R_2$ for each occurrence independently represents an acetyl moiety, alkyl ether, arylether, —O—, or a bond.

7. The composite article of claim 1, wherein $X_1$ comprises a vinyl, epoxy or amine moiety.

8. A composite tube, comprising the composite article of claim 1.

9. A composite article comprising a polyolefin layer, a tie-layer, and a non-polyolefin, wherein said tie-layer comprises:

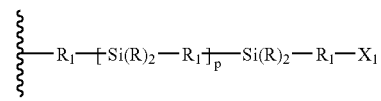

wherein ᴧᴧᴧ represents a polyolefin segment;
$R_1$ independently for each occurrence represents bivalent organic moiety or a bond;
R is selected independently for each occurrence from the group consisting of H, alkyl, alkenyl, alkynl, halogen, aralkyl, aryl, polycyclyl, and carbocycles;
$X_1$ independently for each occurrence represents a moiety that is capable of bonding to said non-polyolefin by a chemical reaction; and
p is an integer from 0 to about 1000.

10. The composite article of claim 9, wherein R is —O-alkyl or —O—H.

11. The composite article of claim 9, wherein $R_1$ is selected independently, for each occurrence, from the group consisting of alkyl, alkenyl, and alkyny, —O—, alkoxy, aryl, heterocyclyl, polycyclyl, carbocycles, and a bond.

12. The composite article of claim 9, wherein $X_1$ comprises a vinyl, epoxy or amine moiety.

13. A composite article comprising a polyolefin layer, a tie-layer, and a non-polyolefin, wherein said tie-layer comprises

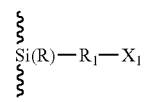

wherein ᴧᴧᴧ represents a polyolefin segment;
$R_1$ independently for each occurrence represents bivalent organic moiety or a bond;
R is selected independently for each occurrence from the group consisting of H, alkyl, alkenyl, alkynl, halogen, aralkyl, aryl, heterocyclyl, polycyclyl, and carbocycles; and
$X_1$ independently for each occurrence represents a moiety that is capable of bonding to said non-polyolefin moiety by a chemical reaction.

14. The composite article of claim 13, wherein for each occurrence, $R_1$ is selected independently from the group consisting of alkyl, alkenyl, and alkynyl, —O—, alkoxy, aryl, heterocyclyl, polycyclyl, carbocycles, and a bond.

15. The composite article of claim 13, wherein $X_1$ comprises a vinyl, epoxy or amine moiety.

* * * * *